United States Patent [19]
Katagiri

[11] 4,061,417
[45] Dec. 6, 1977

[54] COLOR FILTER

[75] Inventor: Yoshio Katagiri, Tokyo, Japan

[73] Assignee: Kabushiki Kaisha Daini Seikosha, Japan

[21] Appl. No.: 629,673

[22] Filed: Nov. 6, 1975

[30] Foreign Application Priority Data

Nov. 14, 1974 Japan .................. 49-131409

[51] Int. Cl.² .............. G02B 5/30; G02F 1/23
[52] U.S. Cl. ............ 350/159; 350/160 LC; 428/1
[58] Field of Search ........ 350/160 LC, 159; 428/1; 252/299, 300 R, 300 P

[56] References Cited

U.S. PATENT DOCUMENTS

| | | | |
|---|---|---|---|
| 3,544,193 | 12/1970 | Laput | 350/159 |
| 3,592,526 | 7/1971 | Dreyer | 350/159 |
| 3,694,054 | 9/1972 | Kirsch | 350/159 |
| 3,768,886 | 10/1973 | Sharpless | 350/160 LC |
| 3,785,721 | 1/1974 | Harsch | 350/160 LC |
| 3,821,720 | 6/1974 | Greubel et al. | 350/160 LC |
| 3,847,139 | 11/1974 | Flam | 350/160 LC |
| 3,856,381 | 12/1974 | Hedman, Jr. et al. | 350/160 LC |
| 3,874,163 | 4/1975 | Ikeno | 350/159 |
| 3,899,786 | 8/1975 | Greubel et al. | 350/160 LC |
| 3,910,682 | 10/1975 | Arai et al. | 350/160 LC |
| 3,936,147 | 2/1976 | Murakami | 350/159 |

Primary Examiner—William R. Dixon, Jr.
Attorney, Agent, or Firm—Robert E. Burns; Emmanuel J. Lobato; Bruce L. Adams

[57] ABSTRACT

A color filter using liquid crystal compounds is disclosed. Mixtures of nematic and cholesteric liquid crystal compounds are sealed between a pair of transparent plates to construct a liquid crystal cell, and a pair of polarizer plates is disposed at both sides of the cell.

The color of the light passing through the filter device can be controlled and changed by changing the angle of the polarized plane defined by each polarizer plate and by changing the ambient temperature surrounding the device or the liquid crystal mixtures within the cell.

6 Claims, 5 Drawing Figures ial layer 4 is sealed
COLOR FILTER

FIELD OF THE INVENTION

This invention relates to color filters using liquid crystal cells and more particularly to control the colors from such filters.

BACKGROUND OF THE INVENTION

Cholesteric liquid crystals are widely used in conventional color display devices. It is simple to obtain chemical substances of changeable color over a wide temperature range by mixing various cholesteric liquid crystal compounds in suitable proportions. These cholesteric liquid crystal materials have been used for temperature measurement apparatus by coating them on surfaces or interposing them between a pair of transparent film sheets. They have been used for printing inks.

Conventional color display devices using cholesteric liquid crystal compounds are divided into two types; the reflection type and the transmission type. In reflection type devices, good contrast is not readily obtainable if the transmitted light is not absorbed by a black background. In transmission type devices, it is difficult to get a display device in which color change is clearly seen.

SUMMARY OF THE INVENTION

It is a primary object of this invention to provide effective color filter devices. Another object of the invention is to provide color filter devices of both the reflection and transmission types of good clarity, adjustable color and good contrast.

According to this invention, a mixture of nematic and cholesteric liquid crystals is sealed between a pair of transparent plates to construct a liquid crystal cell and a pair of polarizers are disposed at the both sides of the cell to complete the device to provide one measure of color control. Another measure of color control is provided by adjustment of the ambient temperature at the device. The color of the light passing through the filter device can be changed by changing the angle of the polarized plane defined by each polarizer and by control of the surrounding or ambient temperature of the device and/or within the cell.

Other and further objects and advantages of the present invention will be apparent to one skilled in the art from the following description taken in conjunction with the accompanying drawings.

DETAILED DESCRIPTION OF THE INVENTION

Figure 1:
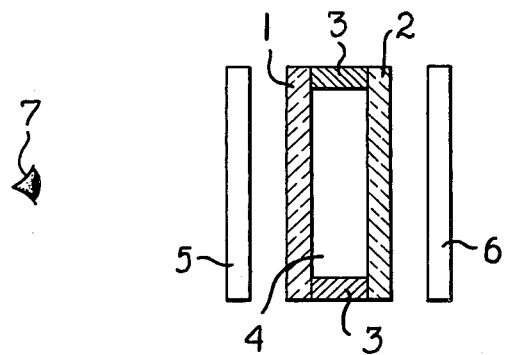
FIG. 1 shows cross-sectional view of the device of this invention.

Referring to FIG. 1, liquid crystal layer 4 is sealed between a pair of transparent plates 1 and 2, maintained at constant thickness by a spacer means 3. A pair of polarizers 5 and 6 are disposed at the outside of the plates 1 and 2. Reference numeral 7 is an observer of this device. When this device is used as a reflection type filter, a reflecting plate (not shown) is disposed at the outside of the polarizer 6. When color control by temperature control is utilized, temperature modifying means (not shown) are used to heat or cool the filter assembly of FIG. 1, or alternately the cell consisting of plates 1 and 2 and liquid crystal layer 4.

The nematic liquid crystal materials used in this device are required to be stable over wide temperature ranges including room temperature.

Liquid crystals of colorless compounds having ester bonds (-COO-) or biphenyl derivatives are better than liquid crystals of colored compounds having azo bonds (-N=N-); azoxy bonds (-NON-); or Schiff's bonds (-CH=N-). The compounds having azo bonds, azoxy bonds or Schiff's bonds etc. have the tendency to absorb the blue to violet light in the region of visible light. When these compounds are incorporated into a color display or filter devices, it is possible to obtain colors of the green and red groups but is difficult to obtain clear colors within the blue shades or hues.

It is preferable to mix at least one cholesteric liquid crystal in an amount of 1 to 20 weight percent of the total mixture with at least one nematic liquid crystal compound. When the quantity of cholesteric liquid crystal compounds mixed with the nematic liquid crystal compounds less than 1 weight percent, hardly any color change is apparent. When more than 20 weight percent is used, good color filters are not available because of the existing color of the mixed materials.

To get good color filters showing uniform color change over a wide temperature range, the optimum quantity of cholesteric liquid crystal mixed with nematic liquid crystal should preferably be from 2 to 10 weight percent.

It is possible to mix one or more kinds of cholesteric liquid crystal compounds with the nematic liquid crystal compounds. Types of cholesteric liquid crystal compounds useful in this invention are organic esters of cholesterol such as chalesteryl erucate, cholesteryl oleate, cholesteryl nonanoate etc. carbonic esters of cholesterol such as cholesteryl oleyl carbonate, cholesteryl-butyl carbonate etc., cholesteryl chloride and cholesteryl bromide.

Nematic liquid crystal compounds used individually or in admixture in this invention are, for example, p-methoxybenzylidene-p-butylaniline; p-ethoxybenzylidene-p-butylaniline; butyl p-(p-ethoxyphenoxy-carbonyl) phenyl carbonate; butyl p-(p-n-hexyloxyphenoxy-carbonyl) phenyl carbonate; p-cyano-P'-n-pentyl-biphenyl; p-cyano-p-n-hexyl-biphenyl; p-methoxy-P'-n-butyl azoxybenzene; p-methoxy-p'-ethyl azoxybenzene.

The thickness of the liquid crystal layer incorporated into the device can be in the range of 5 to 100 microns, preferably from 10 to 30 microns. When the thickness of the liquid crystal layer is too thin, the color changes are hardly observable and thus color filters showing uniform color change are not too useful. On the other hand, when the layer is too thick, the color filters do not provide good contrast as the amount of light is reduced.

Treatments to orient liquid crystal molecules are not necessarily needed when the liquid crystal layer is intervened between a pair of transparent plates, however, to provide color filters of more uniform color tone, it is preferable to treat the surface of the plates to have the anisotropic orientation of the nematic liquid crystal molecules. For aligning the liquid crystal molecules in a uniform direction, such a treatment is carried out as follows: The surfaces of the transparent plates which contact the liquid crystals are rubbed in a single direction with a cloth, or with a volatile organic or inorganic substance.

With such a filter as constructed, one can achieve a desired color freely, at any desired temperature, by changing the setting angle of the polarizers. Similarly colors can be selected and adjusted by varying the temperature of the contained liquid crystal mixture. Combination of these adjustment parameters; temperature and polarization angle provide a good spectrum of available colors.

EXAMPLE 1

A liquid crystal composition including n-butyl p(p-hexyloxy phenoxy carbonyl) phenyl carbonate, 50 weight percent; p-ethyl phenoxy carbonyl phenyl p-n-caproate, 45 weight percent; and cholesteryl nonanoate of 5 weight percent is introduced between a pair of transparent glass plates, (thickness of 0.8mm) to form a cell. The surface of the glass plates in contact with liquid crystal compound is pretreated by rubbing unidirectionally. The rubbed directions of said glass plates are kept parallel. The thickness of the liquid crystal layer is kept at 15 microns by appropriate spacer means. A pair of polarizing elements are disposed at both sides of the liquid crystal cell to construct the filter device shown in FIG. 1.

Figure 2:
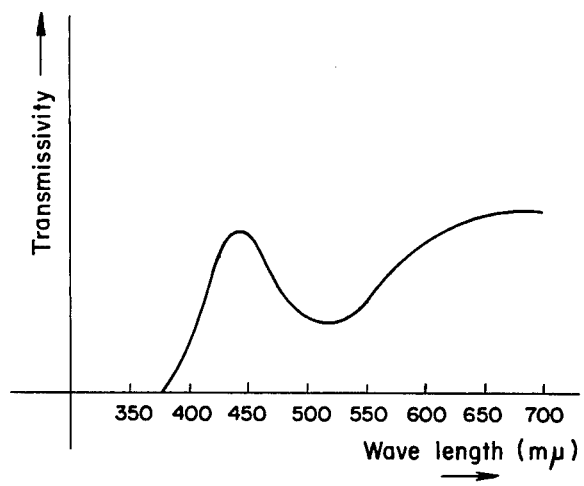
FIGS. 2, 3 and 4 show the resultant wavelength of transmitted white light passing through filters according to the invention, as measured by a spectroscope, in which the angle of polarized plane defined by each polarizer is 90°, 45° and 0° respectively.
Figure 3:
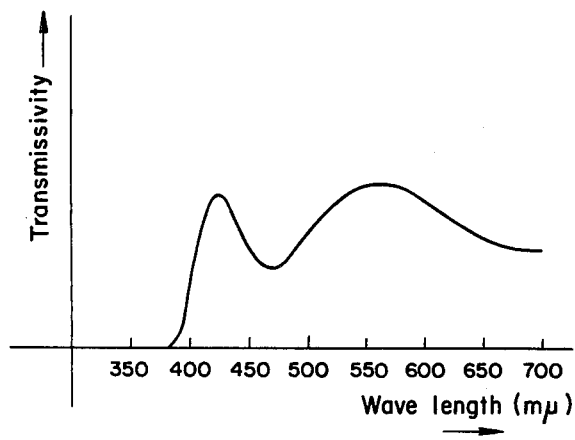
Figure 4:
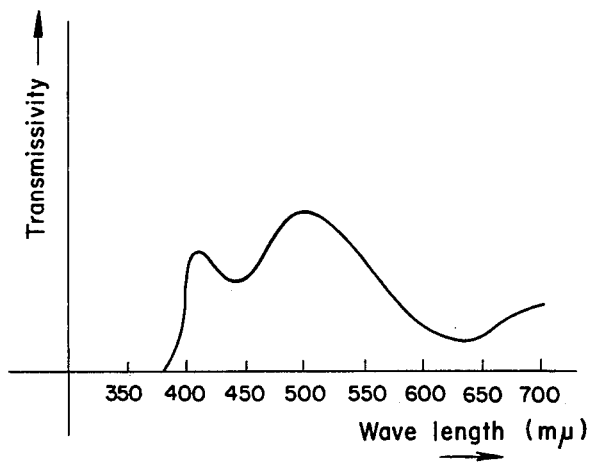
Figure 5:
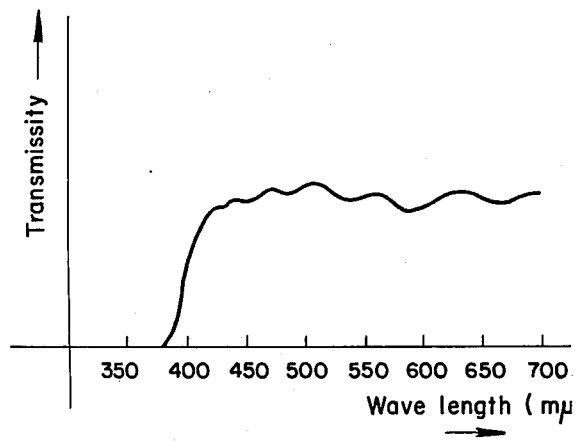
FIG. 5 shows the color transmissivity of a similarly constructed device which includes only nematic liquid crystals instead of the mixture of liquid crystals as required by this invention.

FIGS. 2, 3 and 4 show the wave lengths (color) of the transmitted light when white light is passed through the filter devices of FIG. 1. The wave lengths were measured by a spectroscope. In case of FIG. 2, the angle of the polarized plane defined by each polarizer is 90° and the color of the transmitted light is red purple. In case of FIG. 3, the angle of the polarized plane defined by each polarizer is 45° and the color of the transmitted light is yellow green. In case of FIG. 4, the angle of the polarized plane defined by each polarizer is 0° and the color of the transmitted light is blue green. FIG. 5 shows the transmissivity of the device which includes only nematic liquid crystals. (In this case, the angle of the polarized plane defined by each polarizer is 0°). It will be seen from this figure (FIG. 5) that the unusual filtering characteristic is not available if the cholesteric liquid crystals are not mixed into the cell.

When the temperature of the filter element is changed, the color of light passing through the filter is changed as follows. If the angle of the polarized plane defined by each polarizer is 90°; the color is deep red purple when the temperature is below room temperature, light red purple around room temperature (25° C), and yellow green around 50° C.

If the angle of the polarized plane defined by each polarizer is 0°, the color is light green when the temperature is less than room temperature, blue green around room temperature (25° C), and blue purple around 50° C.

EXAMPLE 2

A liquid crystal composition including p-cyano-p'-n-pentyl biphenyl, 60 weight percent; n-butyl-p-(p-ethoxy phenoxy carbonyl) phenyl carbonate, 37 weight percent; and cholesteryl chloride, 3 weight percent is introduced between a pair of transparent glass plates to form a cell. The thickness of the liquid crystal layer is maintained at 20 microns by a spacer. A pair of polarizers are disposed at the both sides of the liquid crystal cell to construct a filter device as shown in FIG. 1. By including a reflecting surface beyond polarizing plate 6, the device will operate in the reflection mode.

When the surrounding temperature of the filter is changed or when the angle of polarized plane defined by each polarizer is changed, the wave length of the light passing through the filter is changed in a manner similar to Example 1.

The characteristics of the filters operating in either the reflection mode or the transmission mode are nearly same and excellent.

While a preferred embodiment of the invention has been shown and described, it will be understood that many modifications and changes can be made within the true spirit and scope of the invention. All art recognized equivalent materials are intended to be included within the scope of this invention.

What is claimed is:

1. A color controllable filter device comprising a pair of parallel disposed transparent plates and spacer means defining a liquid crystal cell; a mixture of nematic and cholesteric liquid crystal compounds contained in said cell, said cholesteric compounds being present in an amount of from one to twenty weight percent of said mixture, said nematic liquid compounds forming the balance, said crystal mixture in said cell being free from specifically applied stress; a pair of variable-angle polarizers disposed on opposite sides of said liquid crystal cell, the wavelengths of transmissivity and reflectance of light through said device being variably controlled, based upon the polarizing angle between said variable-angle polarizer pair.

2. A color filter device according to claim 1, wherein said nematic liquid crystal compounds are nematic esters or biphenyl liquid crystal derivatives.

3. A color filter device according to claim 1, wherein said cholesteric liquid crystal compounds are selected from the group consisting of organic esters of cholesterol; carbonic esters of cholesterol and compounds having the cholesteric liquid crystalline state.

4. A color filter device according to claim 1, wherein the surface of the transparent plates in contact with said liquid crystal mixture are treated to provide anisotropic orientation of the liquid crystals in said mixture.

5. A color filter device according to claim 1, wherein said cholesteric liquid crystal is from 2 to 10 weight percent of said mixture.

6. A method for obtaining specific colors and changing same which comprises the steps of transmitting or reflecting light through the color filter device according to claim 1 comprising a pair of varying angle polarizing plates positioned one on either side of a liquid crystal cell containing a liquid crystal mixture of 1-20 wt % of at least one cholesteric liquid crystal compound and at least one nematic crystal compound forming the balance, and varying the polarization angle between said polarizing plates to controllably change the color of said light.

* * * * *